Oct. 30, 1923.
A. BRILL
1,472,152
SERVICE BOX FOR SWITCHES
Filed July 6, 1921
FIG. 1.
FIG. 2.
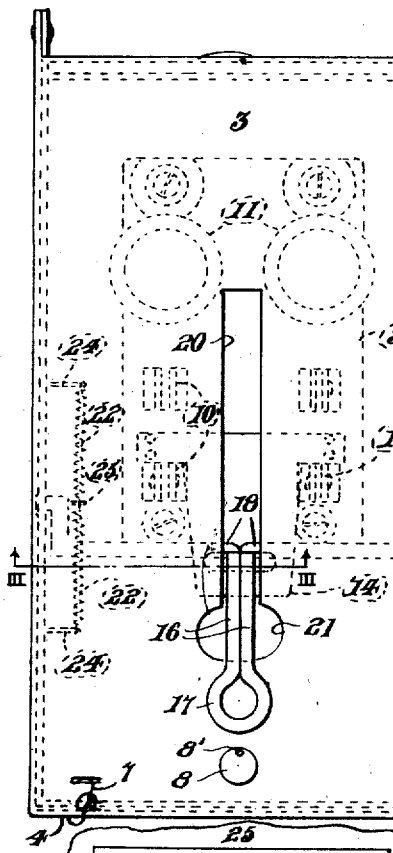
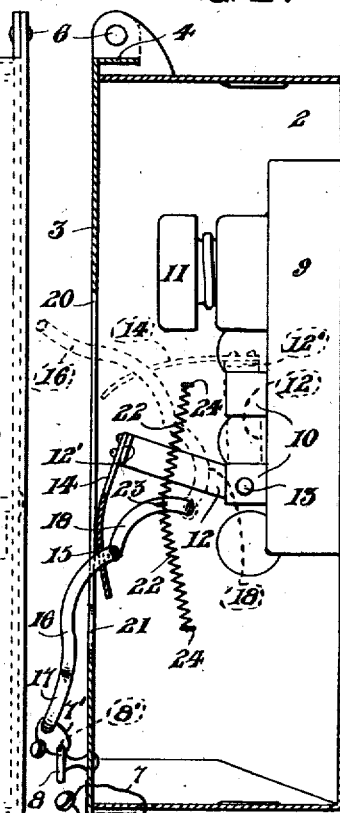
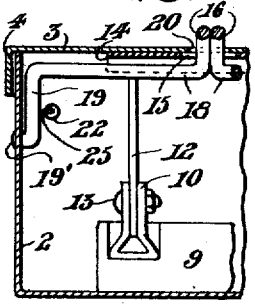
FIG. 3.
FIG. 4.
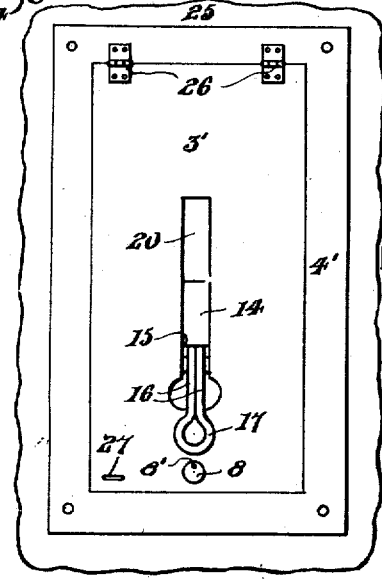
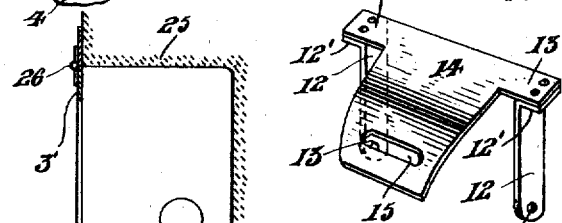
FIG. 5.
FIG. 6.
Inventor
A. Brill
By J. K. Bryant
Attorney Patented Oct. 30, 1923.

1,472,152

UNITED STATES PATENT OFFICE.

ABRAM BRILL, OF SPARTANBURG, SOUTH CAROLINA.

SERVICE BOX FOR SWITCHES.

Application filed July 6, 1921. Serial No. 482,650.

*To all whom it may concern:*

Be it known that I, ABRAM BRILL, a citizen of the United States of America, residing at Spartanburg, in the county of Spartanburg and State of South Carolina, have invented certain new and useful Improvements in Service Boxes for Switches, of which the following is a specification.

This invention relates to certain new and useful improvements in service boxes for switches wherein the main switches of a circuit in house wiring are concealed within the service box with cooperating devices carried by the switch and service box for holding the cover of the box in a locked position when the switch is closed.

A further object of the invention has reference to a service box for electric switches whereby the hinged lid of the box and the switch cooperate with each other to hold the box lid in a closed position when the switch is closed, the box lid being only capable of moving to an open position when the switch is open.

The invention has further reference to a service box for electric switches wherein the hinged cover of the switch box and the switch member are cooperatively constructed to form a locking means for the box cover when the switch is closed, with tension devices associated with the switch member for holding the same in a set position when opened to permit the opening movement of the box cover to obtain access to the interior of the box and the switch for purposes of testing or otherwise.

A still further object of the invention embodies a service box for switches capable of being mounted upon the surface of a wall or countersunk therein for a flush member.

With these general objects in view and others that will appear as the nature of the invention is better understood, the same consists in the novel construction, combination, and arrangement of parts hereinafter more fully described, illustrated in the accompanying drawings, and then claimed.

In the drawings forming a part of this application, and in which like designating characters refer to corresponding parts throughout the several views, Figure 1 is a front elevational view of the service box for electric switches constructed in accordance with the present invention showing the handle extension of the switch blade moved to an open position to permit opening movement of the cover, Figure 2 is a longitudinal sectional view of the service box showing by dotted lines the switch in closed position, and in open position by full lines with seals for retaining the switch in open position and for locking the cover to the box, Figure 3 is a detail sectional view taken on line III—III of Fig. 1, showing the pivotal mounting of the switch blade handle, Figure 4 is a detail perspective view of the switch blade and head detached from the box, Figure 5 is a front elevational view of another form of the service box designed for countersunk or flush mounting showing the hinged door for the service box disposed within the box frame, and Figure 6 is a side elevational view of the box showing the flush mounting.

In the art to which this invention relates it has heretofore been customary to position the operating handles for the switches through the sides of the box, this disposition of the switch handles restricting the mounting of the service box upon the surface of a wall or other support, and further necessitating sufficient space between adjacent boxes to provide a clearance for the movement of the switch handles.

It is now required that service boxes for switches be operated exteriorly from the outer face side of the box with a safety device or lock for the box to prevent the box from being opened when the switch is in a closed position. The present invention designed to meet these requirements has a handle extension attached to the switch blade projecting through a hinged cover on the box, the box being only slightly modified to permit a flush mounting thereof with the surface of a wall or for a surface mounting. It is intended to employ the present type of service box and provide a key slot in the hinged cover thereof through which the handle extension of the switch blade projects, the handle extension being designed for free movement through the slot for operating the switch with the handle cooperating with the box cover to provide a lock for the cover when the switch is in a closed position and only permitting the cover of the box to be moved to an open position when the switch is opened. When a service box is out of service and the switch moved to an open position, the handle extension of the switch is locked in an open position while the cover is also locked to the box by lead seals or other devices. Tensioned means is associated with the handle extension of the switch member and operates to hold the switch in a closed position and also in a fixed open position to present the outer end of the handle for passage through the enlarged end of the key slot in the box covering.

Referring more in detail to the accompanying drawing, and particularly to Figs. 1 to 4 there is illustrated a service box embodying a rear wall 1, side and end walls 2, and a cover wall 3 having down-turned flanges 4 enclosing the side walls of the box with cooperating ears 5 carried by the flanges and opposite side walls of the box with the rivet 6 connecting the ears to form a hinged connection between the box and cover. To prevent tampering with the interior mechanism of the service box, the wire 7 of a lead seal or other securing device is passed through the cover and side wall of the box as shown in Figs. 1 and 2, while a handle 8 attached to the free swinging end of the cover is adapted to be grasped to move the cover to an open or closed position.

The switch mechanism within the casing embodies a block 9 connected to the service wire and carrying switch contacts 10 and a fuse 11, switch blades 12 being hinged as at 13 to a pair of contacts 10' as shown in Fig. 2 with the upper ends thereof bent outwardly as at 12'' to provide a support for the end extensions 13 of the T-shaped head 14 formed of non-conducting material. The T-shaped head 14 is formed upon an arc as shown in Figs. 2 and 4 and has a transverse slot 15 adjacent the free end thereof.

The handle associated with the switch blades and head 14 embodies a wire member formed of a single piece and bent to provide adjacent portions 16 with an enlarged outer end 17 while the sections 16 opposite the enlarged end are bent in opposite directions to extend in the same plane as indicated at 18, said sections 18 being further bent as at 19 at right angles, with the terminal ends thereof pivotally supported as at 19' in the opposite side walls 2 of the box, this construction being clearly shown in Figs. 1 and 3.

As shown in Figs. 1 and 2 the cover 3 of the box is provided with an elongated key hole T-shaped slot 20 having an enlarged end 21 through which slot and enlarged end the adjacent sections 16 and enlarged end 17 of the handle project, said handle being freely movable through the slot for the operation of the switch, it being understood that the adjacent sections 16 of the switch project through the transverse slot 15 of the T-shaped head as shown in Figs. 2 and 3, so that movement of the switch handle will shift the head and the switch blades 12 carried thereby for moving the switch blades to either their open or closed positions.

As shown in Figs. 1 and 3 a pair of springs 22 are associated with the right angle extensions 19 of the switch handle, said springs being connected at their adjacent ends to the pin 23 projecting inwardly from one of the extensions 19 and further anchored at their outer ends to pins 24 secured to the adjacent side wall of the box, the mounting of the springs being such that one of the springs will be thrown beyond the dead center when the switch blades 12 are moved to their closed position so to hold the switch while the two springs will counteract the force of each other when the handle moves the switch to open position to present the handle adjacent the enlarged end 21 of the slot 20 to permit the cover to be opened.

In the form of the invention shown in Figs. 5 and 6, the side flanges 4' extend at right angles to the side walls 2 of the box for a countersunk or flush mounting within the wall 25 as illustrated. In this form of the invention the hinged cover or door 3' is mounted upon hinges 26 and is maintained in a locked condition by the switch handle 16 cooperating with the slot 20 while a lug 27 carried by the box and projecting through an opening in the cover 3' receives a seal similar to the seal 7 shown in the preferred form.

When the service box is disconnected from the electric current the handle 16 is locked in an open position, the knob 8 in each form of the invention being provided with a side opening 8' for the reception of the seal 7'.

With this device, the present type of service box may be employed to meet all requirements by providing a slot in the cover of the box and a handle extension for the switch blade while the handle extension projecting through the cover of the box at the front side thereof will permit the mounting of an increased number of boxes in a restricted area as contrasted by the side positioning of the handles projecting through the side walls of the box.

From the above detailed description it is believed that the construction and operation of the service box will be readily understood, it being noted however that the handle for the switch blades cooperates with the box cover to hold the cover in locked position when the switch is closed, and the springs associated with the handle tending to hold the switch blades and handle in a closed position and further presenting the handle at the enlarged end of the cover slot when the switch is in an open position to permit the opening of the box cover.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. In combination, a service box having a hinged cover with a slot in the cover provided with an enlarged end, a switch disposed in the box, said switch embodying an insulated head having a slot therein, and a handle extension pivoted to said box and extending through said switch head slot and the cover slot adapted to hold the cover in a closed position when disposed at one end of the slot with the switch closed and to permit opening movement of the cover when moved to the enlarged end of the slot with the switch in open position, tension means associated with the handle extension for holding the switch in closed position and further holding the switch handle extension in a position adjacent the enlarged end of the slot.

2. In combination, a service box having a switch disposed therein, a hinged cover provided with a keyhole shaped slot, said switch embodying a pair of blades, an insulating head carried by said blades and having a transverse slot therein, a handle extension embodying a pair of parallel sections extending through the said head slot, and lateral extensions journaled in the side walls of the box, the parallel sections extending through the keyhole-shaped slot in the cover and an enlarged head carried by the outer ends of the parallel sections cooperating with said slot to hold the cover in a closed position when the head is at the reduced end of the slot and to permit opening movement of the cover when the head is at the enlarged end of the slot.

3. In combination, a service box, a switch disposed therein, a hinged cover for the box having a key-hole-shaped slot therein, an insulated head substantially rectangular in plan view and longitudinally curved carried by the switch and having a transverse slot therein adjacent the outer end, and a handle extension embodying side arms pivoted in the side walls of the box and slidably extending through the switch head slot and cover slot for controlling movement of the cover relative to the open and closed positions of the switch.

In testimony whereof I affix my signature.

ABRAM BRILL.